United States Patent [19]
Ercoli et al.

[11] 3,789,121
[45] Jan. 29, 1974

[54] 17α,21-ORTHOBUTYRATES OF 6α, 9α-DIFLUORO-HYDROCORTISONE AND 6α, 9α-DIFLUOROPREDNISOLONE, COMPOSITIONS CONTAINING SAME AND THE USE THEREOF AS ANTI-INFLAMMATORY AGENTS

[75] Inventors: Alberto Ercoli, Milan; Rinaldo Gardi, Carate Brianza, both of Italy

[73] Assignee: Warner-Lambert Company, Morris Plains, N.J.

[22] Filed: Nov. 26, 1971

[21] Appl. No.: 202,686

Related U.S. Application Data

[60] Division of Ser. No. 55,260 July 15, 1970, which was a continuation-in-part of Ser. No. 716,287, Mar. 27, 1968, both abandoned.

[52] U.S. Cl. .............................................. 424/241
[51] Int. Cl. .......................................... A61k 17/00
[58] Field of Search .................................... 424/241

[56] References Cited
UNITED STATES PATENTS

| | | | |
|---|---|---|---|
| 2,838,499 | 6/1958 | Spero et al. | 260/239.55 |
| 3,147,249 | 9/1964 | Ercoli et al. | 260/239.55 |
| 3,152,154 | 10/1964 | Ercoli et al. | 260/397.45 |
| 3,297,729 | 1/1967 | Mancini et al. | 260/397.4 |
| 3,312,590 | 4/1967 | Elks et al. | 424/243 |
| 3,312,591 | 4/1967 | Elks et al. | 424/243 |
| 3,376,193 | 4/1968 | Elks et al. | 424/243 |
| 3,383,394 | 5/1968 | Weber et al. | 260/397.45 |

*Primary Examiner*—Shep K. Rose
*Attorney, Agent, or Firm*—Albert H. Graddis et al.

[57] ABSTRACT

There have been prepared the new 17α, 21-orthobutyrates of 6α, 9α-difluorohydrocortisone and 6α, 9α-difluoroprednisolone -difluoroprednisolone useful as anti-inflammatory agents. The compounds may be used in the form of pharmaceutical formulations in corticoid anti-inflammatory therapy.

15 Claims, No Drawings

17α,21-ORTHOBUTYRATES OF 6α, 9α-DIFLUORO-HYDROCORTISONE AND 6α, 9α-DIFLUOROPREDNISOLONE, COMPOSITIONS CONTAINING SAME AND THE USE THEREOF AS ANTI-INFLAMMATORY AGENTS

This application is a division of application Ser. No. 55,260, filed July 15,1960, which application was a continuation-in-part of application Serial No. 716,287, filed Mar. 27, 1968, both applications now abandoned.

The present invention relates to new and useful steroid compounds, having enhanced anti-inflammatory activity. This invention is based on the discovery that the new compounds disclosed herein exhibit a sustained and prolonged anti-inflammatory effect by parenteral administration, contrary to other closely analogous compounds which have low or no systemic activity.

The new steroid compounds of this invention are the 17α, 21-orthobutyrates of 6α, 9α-difluorohydrocortisone and 6α, 9α-difluoroprednisolone, represented by the following structural formula:

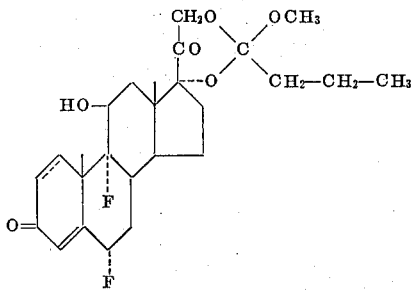

I wherein the dotted line indicates the possible presence of a double bond at the 1(2)-position.

These compounds show anti-inflammatory properties particularly high in comparison with those of the known 6α, 9α-difluorohydrocortisone and 6α, 9α-difluoroprednisolone and of their 21-esters. They possess increased topical and systemic activity and in addition show the advantage of a sustained and prolonged anti-inflammatory effect on parenteral administration, as evidenced by tests on animals over a 7 days period after a single injected therapeutic dose. The new 17, 21-orthobutyrates of this invention are highly effective and permit to obtain an anti-inflammatory response of longer duration than that given 10 times the therapeutic dose of 6α, 9α-difluorohydrocortisone. This prolongation of activity found in a 17, 21-orthoester structure is unexpected since it is known that the 17, 21-steroid orthoesters are active only when topically applied but of low activity when administered systemically.

On account of their particular properties, the new 17, 21-orthobutyrates of this invention are useful in the form of pharmaceutical compositions for the topical and systemic treatment of inflammatory conditions and diseases.

The high potency and the prolonged action of the compounds of this invention permit a significant reduction of dosage in steroid therapy. In fact, the 17, 21-orthobutyrates can be administered in extremely low dosage thereby minimizing the side effects which can result from a prolonged administration of anti-inflammatory steroids.

The compounds of this invention are utilized in the form of pharmaceutical compositions in combination with a pharmaceutically acceptable carrier or diluent suitable for oral, parenteral or topical application. In the form of injectable preparations the 17, 21-orthobutyrates of 6α, 9α-difluorohydrocortisone and 6α, 9α-difluoroprednisolone exhibit their prolonged anti-inflammatory action and these perparations are obtained in the form of sterile aqueous suspensions or oily solutions for intramuscular, subcutaneous and intravenous use. When orally administered the active ingredients are compounded with the usual carriers suitable for oral ingestion in the form of pills, tablets, capsules and syrups.

For topical application the active ingredients are incorporated in the usual compatible vehicles utilized for the preparation of powders, ointments, lotions, creams, emulsions, drops, sprays and other forms particularly suitable for dermatological use. The carriers employed are those which have already been proposed for use in manufacturing preparations for topical use, such as for example fats of animal origin and vegetable oils, saturated or unsaturated fatty acids, aluminium stearate, alcohols, poly-alcohols, such as for example glycerol, propylene or polyethylene glycols, waxes, aliphatic hydrocarbons or lanolin, together with comparatively high quantities of water. Other carriers which can be used are hydrophilic bases, cholesterol, vaseline, vaseline oil, silicones which are physiologically inert, sodium alginate and in addition stabilizing, thickening and colouring agents and perfumes.

The compositions of the present invention can also contain preservative or bacteriostatic agents such as for example esters of p-hydroxy benzoic acid, i.e., methyl-, ethyl- or propyl-p-hydroxy benzoate, mercuric derivatives such as for example the merthiolate, or quaternary ammonium derivatives such as for example cetyl-trimethyl-ammonium bromide, which besides the surface active action possess a good bacteriostatic activity.

Other active ingredients capatible with the new steroids of this invention, such as for example antibiotics, local anesthetics or sulphonamides can also be incorporated in the anti-inflammatory preparations if these added properties or characteristics are desired.

The 17,21-orthobutyrates of 6α,9α-difluorohydrocortisone and 6α,9α-difluoroprednisolone are included in the compositions of this invention in an amount sufficient to produce the desired therapeutic effect upon the inflammatory process or condition. Advantageously the compositions will contain the active ingredient in an amount of from 0.0005% to 5% by weight, and preferably contain the specific active ingredient in an amount of from 0.005% to 0.5% by weight.

To improve the stability of the active ingredients in the aqueous vehicles it is advisable to adjust the pH of the compositions to a value not lower than 7, for example by adding an organic or inorganic base, such as, for example, triethanolamine.

The new 17, 21-orthoesters of the present invention are prepared by treatment of the corresponding diols with methyl-orthobutyrate in the presence of an acid catalyst. The orthoesterification is preferably carried out in elevated temperature (around 100°–110° C) and the resulting 17α,21-orthobutyrate of 6α,9α-difluorohydrocortisone or 6α,9α-difluoroprednisolone is obtained as a mixture of two epimeric orthoesters, which can be separated according to the usual procedures. In practice we prefer to use the mixture of the two epimers as such for the preparation of the pharmaceutical compositions as described in the experimental part.

This invention is illustrated but not limited by the following examples.

EXAMPLE 1

A mixture of 1 g of 6α, 9α-difluorohydrocortisone, 3 cc of methylorthobutyrate and 10 mg of paratoluenesulfonic acid in 5 cc of dimethylformamide is maintained overnight under nitrogen stream at 105° C (bath temperature). Then there are added a few drops of pyridine and the solvent is evaporated under vacuum. The residue is taken up with little methanol, filtered and the product crystallized from a methanol-methylene chloride mixture. The 17α, 21-(1'-methoxy) n-butylidenedioxy-6α, 9α-difluoro-Δ⁴-pregnen-11β-ol-3,20-dione is so obtained; M.P. 188°–192° C, $[\alpha]_D^{22} = +84°$ (dioxane, c = 0.5%). On thin layer chromatography this product appears consisting of two epimers which can be separated by fractional crystallization. They show slight differences in melting point and specific rotation, but possess the same degree of activity.

EXAMPLE 2

A mixture of 2 g of 6α, 9α-difluoroprednisolone, 6 cc of methylorthobutyrate and 20 mg of p-toluenesulfonic acid in 10 cc of dimethylformamide is maintained overnight under nitrogen stream on an oil-bath at 105° C. Then the mixture is neutralized by addition of a few drops of pyridine and concentrated under vacuum to dryness. The residue is taken up with little methanol, filtered and the product crystallized from a methanol-methylene chloride mixture to give the 17α, 21-(1'-methoxy)-n-butylidenedioxy-6α, 9α-difluoro-Δ¹,⁴-pregnadien-11β-ol-3,20-dione; M.P. 194°–198° C; $[\alpha]_D^{22} = +58°$ (dioxane, c=0.5%). On thin layer chromatography this product appears consisting of two epimers which can be separated by fractional crystallization. They show slight differences in melting point and specific rotation, but possess the same degree of activity.

EXAMPLE 3

Biological assay — The sustained anti-inflammatory activity of the two 17, 21-orthobutyrates of this invention was evaluated using the rat granuloma pouch assay of Robert and Nezamis (Acta Endocr. 25, 105; 1957), as follows: Female Wistar rats weighing about 150 g were injected subcutaneously with 25 ml of sterile air under ether anesthesia and croton oil (0.5 ml of 1% solution in corn oil) was injected into the pneumoderma. The test steroid as a microcrystalline suspension in 0.2 ml of aqueous carboxymethyl cellulose was subcutaneously injected in a single dose. Eight days later the animals were sacrificed and the exudate was collected and measured, the volume of exudate being inversely proportional to the anti-inflammatory potency of the steroid.

By this procedure the sustained activity of the two 17, 21-orthobutyrates of this invention was determined and compared with that of the parent steroids and of two structurally related 17, 21-orthoesters well known

TABLE 1.—GRANULOMA POUCH (ASSAY NO. 3081)

| Compound (0.2 ml. suspending vehicle) | Single dose/rat | | Exudate, ml. |
|---|---|---|---|
| | μMoles | Mg. | |
| Control | | | 22.0±1.86 |
| 6α,9α-difluoroprednisolone 17,21-methyl-orthobutyrate | 1 | 0.481 | 3.4±0.56 |
| | 10 | 4.81 | 1.2±0.74 |
| 6α,9α-difluorohydrocortisone 17,21-methyl-orthobutyrate | 1 | 0.483 | 8.0±1.13 |
| | 10 | 4.83 | 0.9±0.17 |
| 6α,9α-difluoroprednisolone | 1 | 0.396 | 19.2±1.65 |
| | 10 | 3.96 | 1.9±0.64 |
| 6α,9α-difluorohydrocortisone | 1 | 0.398 | 23.6±2.58 |
| | 10 | 3.98 | 10.3±2.10 |
| Betamethasone 17,21-methylorthobutyrate | 1 | 0.477 | 20.5±2.81 |
| | 10 | 4.77 | 20.9±3.20 |
| Hydrocortisone 17,21-methylorthovalerate | 1 | 0.461 | 18.8±2.83 |
| | 10 | 4.61 | 19.6±2.60 | in the art. The results of the experiment carried out at two dose levels are reported in the table below.

The results of this experiment show that the 17, 21-methyl-orthobutyrates of 6α, 9α-difluorohydrocortisone and 6α, 9α-difluoro-prednisolone possess a systemic anti-inflammatory activity which persists through a week period after a single therapeutic dose. This activity is about 10 times greater than that of the parent steroids, while the analogous 17, 21-methylorthobutyrate of betamethasone and 17, 21-methylorthovalerate of hydrocortisone are almost inactive when given by systemic route.

EXAMPLE 4

An oil solution for parenteral use containing 0.05% by weight of 6α, 9α-difluorohydrocortisone 17α, 21-methylorthobutyrate was prepared by dissolving 0.5 g of the active ingredient in one liter of sesame oil and transferring the solution to suitable sized sterile vials under aseptic conditions.

In the same manner, 3 g of 17α,21-methylorthobutyrate of 6α,9α-difluoroprednisolone were dissolved in 500 cc mixture of sesame oil and olive oil and the limpid solution filled into 0.2 cc soft gelatin capsules for oral use so that each capsule contains 0.3% by weight of active ingredient.

EXAMPLE 5

The parenteral aqueous suspension at 0.1% by weight was prepared with the following ingredients:
  6α,9α-Difluoroprednisolone 17α,21-methylorthobutyrate— 1 mg
  Benzyl alcohol —0.02 ml
  Polysorbate 80 U.S.P. —8 mg
  Water for injection U.S.P. to 1 ml.

A similar aqueous suspension at 0.5% by weight had the following composition:
  6α,9α-Difluoroprednisolone 17α,21-methylorthobutyrate— 5 mg
  Polyethylene glycol 400 U.S.P. —20 mg
  Polysorbate 80 U.S.P. —8 mg
  Water for injection U.S.P. to 1 ml

EXAMPLE 6

Tablets for oral use each containing 0.1% by weight of active compound were prepared by mixing the appropriate quantity of 17α, 21-methylorthobutyrate of 6α, 9α-difluorohydrocortisone with lubricants such as magnesium stearate and lactose to form a homogenized mixture which is then compressed into tablets.

Capsules for oral administration were prepared by filling into soft gelatin capsules 4 mg of the active ingredient mixed with diluents, such as powered lactose and powered sucrose.

EXAMPLE 7

An ointment having the following composition was prepared for external use following accepted pharmaceutical compounding procedures.

| Components | Percent (%) By Weight |
|---|---|
| 17α, 21-methylorthobutyrate of difluoroprednisolone | 0.10 |
| Beeswax | 5.00 |
| Anhydrous lanolin | 5.00 |
| White soft paraffin | 20.00 |
| Amphocerin K (Dehydag, Deutsche Hydrierwerke G.m.b.H., Dusseldorf) | 25.00 |
| Liquid paraffin | 14.90 |
| Distilled water adjusted to pH7.5 with triethanolamine | 30.00 |

Melt the beeswax, the lanolin, the white soft paraffin and the liquid paraffin at 70° C, add the active ingredient, then the mixture of the Amphocerin K and the water. Refine twice.

EXAMPLE 8

Hydrophilic ointment having the following composition:

| Components | Percent (%) By Weight |
|---|---|
| 17α, 21-methylorthobutyrate of 6α, 9α-difluoroprednisolone | 0.300 |
| Propylparaben | 0.015 |
| Methylparaben | 0.025 |
| Sodium laurylsulphate | 1.000 |
| Propylene glycol | 12.000 |
| Stearyl alcohol | 25.000 |
| White soft paraffin | 25.000 |
| Distilled water adjusted to pH 7.5 with triethanolamine (to 100%) | |

Melt the stearyl alcohol and the white soft paraffin on a steam bath, and warm about 75° C, add a solution of the active ingredient in the propylene glycol, then the other ingredients, previously dissolved in the water and warmed to 75° C. Stir the mixture until it congeals.

In the above hydrophilic ointment sodium laurylsulphate can be replaced by polyoxyl 40 stearate in an amount of 5% by weight.

EXAMPLE 9

Cream having the following composition:

| Components | Percent (%) By Weight |
|---|---|
| 17α, 21-methylorthobutyrate of 6α, 9α-difluoro-prednisolone | 0.050 |
| Cetostearyl alcohol | 12.000 |
| White soft paraffin | 6.480 |
| Liquid paraffin | 6.480 |
| Isopropyl stearate | 3.240 |
| Propylene glycol | 3.240 |
| Methylparaben | 0.180 |
| Propylaparaben | 0.050 |
| Tween 80 | 0.200 |
| Polyethylene glycol 6000 | 4.950 |
| Distilled water adjusted to pH 7.5 with triethanol-amine | 63.130 |

Melt the cetostearyl alcohol, the white soft paraffin, the liquid paraffin and the isopropyl stearate at about 70° C, add a solution of the active ingredient in the propylene glycol, then the other ingredients previously mixed with the water and warmed to 70° C. Refine twice.

EXAMPLE 10

Cream having the following composition:

| Components | Percent (%) By Weight |
|---|---|
| 17α, 21-methylorthobutyrate of 6α, 9α-difluoro-hydrocortisone | 0.025 |
| Propylparaben | 0.015 |
| Methylparaben | 0.025 |
| Cetyl trimethylammonium bromide | 1.000 |
| Propylene glycol | 12.000 |
| Stearyl alcohol | 15.000 |
| White soft paraffin | 12.775 |
| Liquid paraffin | 22.500 |
| Distilled water adjusted to pH 7.5 with triethanol-amine | 36.660 |

Melt the stearyl alcohol, the white soft paraffin and the liquid paraffin at 75° C, add a solution of the active ingredient in the propylene glycol, then the other ingredients previously mixed with the water and warmed to 75° C. Refine twice

EXAMPLE 11

Ointment having the following composition:

| Components | Percent (%) By Weight |
|---|---|
| 17α, 21-methylorthobutyrate of 6α, 9α-difluoro-hydrocortisone | 0.20 |
| Lanolin | 14.45 |
| Liquid paraffin | 17.75 |
| Neomycin sulphate | 0.40 |
| White soft paraffin | 67.20 |

Add the 17α, 21-(1'-methoxy)-n-butylidenedioxy-6α, 9α-difluoro-Δ⁴-pregnen-11β-ol-3,20-dione and the neomycin sulphate to the other ingredients previously melted at 75° C and refine twice.

In place or besides the neomycin sulphate other topically active antibiotics can be used, such as colistin sulphate, bacitracin, gramicidin, chloramphenicol or the sulphonamides.

EXAMPLE 12

Ophthalmic ointment having the following composition:

| Components | Percent (%) By Weight |
|---|---|
| 17α, 21-methylorthobutyrate of 6α, 9α-difluoro-prednisolone | 0.025 |
| Liquid paraffin | 29.975 |
| White soft paraffin | 70.000 |

Add the active product to the other ingredients, previously sterilized by heating at 120° C for an hour. Refine twice and distribute into sterile tubes.

EXAMPLE 13

Lotion having the following composition:

| Components | Percent (%) By Weight |
|---|---|
| 17α, 21-methylorthobutyrate of 6α, 9α-difluoro-hydrocortisone | 0.4 |
| Ethyl alcohol 95° | 40.0 |
| Water adjusted to pH 7.5 with triethanolamine | 59.0 |
| Cologne water | 0.6 |

EXAMPLE 14

Lotion having the following composition :

| Components | Percent (%) By Weight |
|---|---|
| 17α, 21-methylorthobutyrate of 6α, 9α-difluoro-prednisolone | 0.03 |
| Ethyl alcohol 95° | 50.00 |
| Propylene glycol | 20.00 |
| Distilled water adjusted to pH 7.5 with triethanol-amine | 29.97 |

Dissolve the active product in the alcohol and add the solution to a clear mixture of the other ingredients.

EXAMPLE 15

Lotion having the following composition :

| Components | Percent (%) By Weight |
|---|---|
| 17α, 21-methylorthobutyrate of 6α, 9α-difluoro-hydrocortisone | 0.05 |
| Ethyl alcohol 95° | 40.00 |
| Glycerol | 10.00 |
| Glycerol | 30.00 |
| Distilled water adjusted to pH 7.5 with triethanol-amine | 19.95 |

Prepared as described in Example 14.

It is to be noted that the term 17α, 21-methylortho-butyrate of 6α, 9α-difluorohydrocortisone is the common name used herein for 17α, 21-(1'-methoxy)-n-butylidenedioxy-6α, 9α-difluoro-Δ⁴-pregnen-11β-ol-3, 20-dione. Similarly, the term 17α, 21-methylorthobutyrate of 6α, 9α-difluoroprednisolone is used for 17α, 21-(1'-methoxy)-n-butylidenedioxy-6α, 9α-difluoro-Δ¹,⁴-pregnadien-11β-ol-3, 20-dione.

We claim:

1. A compound of formula:

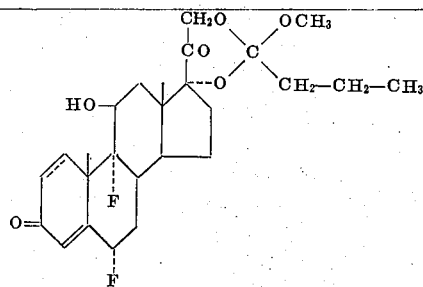

wherein the dotted line indicates the possible presence of a double bond at the 1(2)-position.

2. A composition as claimed in claim 1 containing from 0.0005% to 5% by weight of the active ingredient.

3. A composition as claimed in claim 1 containing from 0.005% to 0.5% by weight of the active ingredient.

4. A pharmaceutical composition for the treatment of inflammation comprising, as the active ingredient, a compound of formula:

wherein the dotted line indicates the possible presence of a double bond at the 1(2)-position, in association with a pharmaceutical carrier.

5. A pharmaceutical composition as claimed in claim 5 having a sustained anti-inflammatory action on parenteral administration wherein the compound is used in association with a systemic, pharmaceutically acceptable carrier.

6. A method of obtaining a sustained anti-inflammatory action which comprises systemically administering an effective amount of a compound of formula:

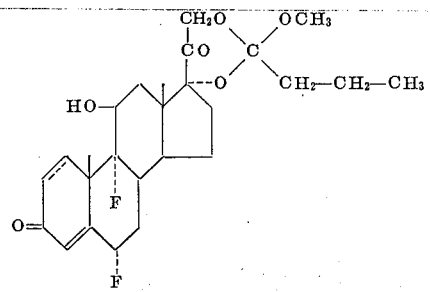

wherein the dotted line indicates the possible presence of a double bond at the 1(2)-position, incorporated in a systemic pharmaceutically acceptable carrier.

7. A composition as claimed in claim 5 wherein the compound is 17α,21-(1'-methoxy)-n-butylidenedioxy-6α, 9α-difluoro-Δ⁴-pregnen-11β-ol-3,20-dione.

8. A composition as claimed in claim 5 wherein the compound is 17α, 21-(1'-methoxy)-n-butylidenedioxy-6α,9α-difluoro-Δ¹,⁴-pregnadien-11β-ol-3,20-dione.

9. A pharmaceutical composition as claimed in claim 2 for the local treatment of inflammation, wherein the compound is used in association with a topical pharmaceutical carrier.

10. A composition as claimed in claim 9 wherein the compound is 17α, 21-(1'-methoxy)-n-butylidenedioxy-6α, 9α-difluoro-Δ⁴-pregnen-11β-ol-3,20-dione.

11. A composition as claimed in claim 8 wherein the compound is 17α,21-(1'-methoxy)-n-butylidenedioxy-6α,9α-difluoro-Δ¹,⁴-pregnadien-11β-ol-3,20-dione.

12. A method as claimed in claim 6 wherein from 0.0005% to 5% by weight of the compound is administered.

13. A method as claimed in claim 6 wherein from 0.005% to 0.5% by weight of the compound is administered.

14. A method as claimed in claim 6 wherein the compound is 17α,21-(1'-methoxy)-n-butylidenedioxy-6α,9α-difluoro-Δ⁴-pregnen-11β-ol-3,20-dione.

15. A method as claimed in claim 6 wherein the compound is 17α,21-(1'-methoxy)-n-butylidenedioxy-6α,9α-difluoro-Δ¹,⁴-pregnadien-11β-ol-3,20-dione.

* * * * *

UNITED STATES PATENT OFFICE
CERTIFICATE OF CORRECTION

Patent No. 3,789,121     Dated January 29, 1974

Inventor(s) Alberto Ercoli et al.

It is certified that error appears in the above-identified patent and that said Letters Patent are hereby corrected as shown below:

In the ABSTRACT, line 3, cancel "difluoroprednisolone" second occurrence. Column 1, line 7, "1960" should read -- 1970 --. Column 2, line 23, "aluminium" should read -- aluminum --; line 40, "capatible" should read -- compatible --; line 64, "in" should read -- at --. Column 4, line 21, "below" should read -- above --. Columns 7 and 8 should appear as shown on the attached sheet.

Signed and sealed this 22nd day of October 1974.

(SEAL)
Attest:

McCOY M. GIBSON JR.
Attesting Officer

C. MARSHALL DANN
Commissioner of Patents